United States Patent
Blackman et al.

(10) Patent No.: US 6,892,625 B2
(45) Date of Patent: May 17, 2005

(54) DOUBLE ROD END CYLINDER WITH SPLIT RING COUPLING

(75) Inventors: Donald E. Blackman, Tinley Park, IL (US); Ming Liu, Westmont, IL (US); Alex Tyutyunik, Buffalo Grove, IL (US)

(73) Assignee: Parker-Hannifin Corporation, Cleveland, OH (US)

(*) Notice: Subject to any disclaimer, the term of this patent is extended or adjusted under 35 U.S.C. 154(b) by 79 days.

(21) Appl. No.: 10/345,439

(22) Filed: Jan. 15, 2003

(65) Prior Publication Data

US 2003/0145723 A1 Aug. 7, 2003

Related U.S. Application Data

(60) Provisional application No. 60/353,795, filed on Feb. 1, 2002.

(51) Int. Cl.[7] .................................................. F16J 1/00
(52) U.S. Cl. ....................................................... 92/255
(58) Field of Search ............................. 92/255; 403/273, 403/332

(56) References Cited

U.S. PATENT DOCUMENTS

| | | |
|---|---|---|
| 2,343,751 A | 3/1944 | Crothers |
| 3,055,719 A | 9/1962 | Kampert |
| 3,397,893 A | 8/1968 | Kampert |
| 3,426,656 A | 2/1969 | Bimba |
| 3,426,657 A | 2/1969 | Bimba |
| 3,457,842 A | 7/1969 | Tennis |
| 3,951,048 A | 4/1976 | Bloom, Jr. et al. |
| 4,004,499 A | 1/1977 | Beck |
| 4,024,802 A | 5/1977 | Koppa |
| 4,157,122 A | 6/1979 | Morris |
| 4,180,274 A | 12/1979 | Tucek |
| 4,631,973 A | 12/1986 | Eley |
| 4,815,360 A * | 3/1989 | Winterle ...................... 92/255 |
| 5,586,483 A * | 12/1996 | Sine ............................ 92/255 |

* cited by examiner

Primary Examiner—Edward K. Look
Assistant Examiner—Michael Leslie
(74) Attorney, Agent, or Firm—Christopher H. Hunter

(57) ABSTRACT

A fluid-actuated cylinder includes a piston rod with a circumferential groove. A split ring, with predetermined linear expansion properties, is cooled to a temperature below the temperature of the rod, and the ring halves are located in the groove. The ring is then equalized with the temperature of the rod, and expands into compression against the sidewalls of the groove. An interference fit is provided with the groove, which prevents axial and rotational movement of the ring with respect to the piston rod. The expansion also prestresses the piston rod between the groove sidewalls. The split ring is then connected to an annular flange on a ring-shaped piston to fix the piston with respect to the piston rod. The piston rod assembly is then located in a cylinder housing, with the piston providing a fluid seal with the cylinder walls as the piston rod reciprocates.

19 Claims, 4 Drawing Sheets

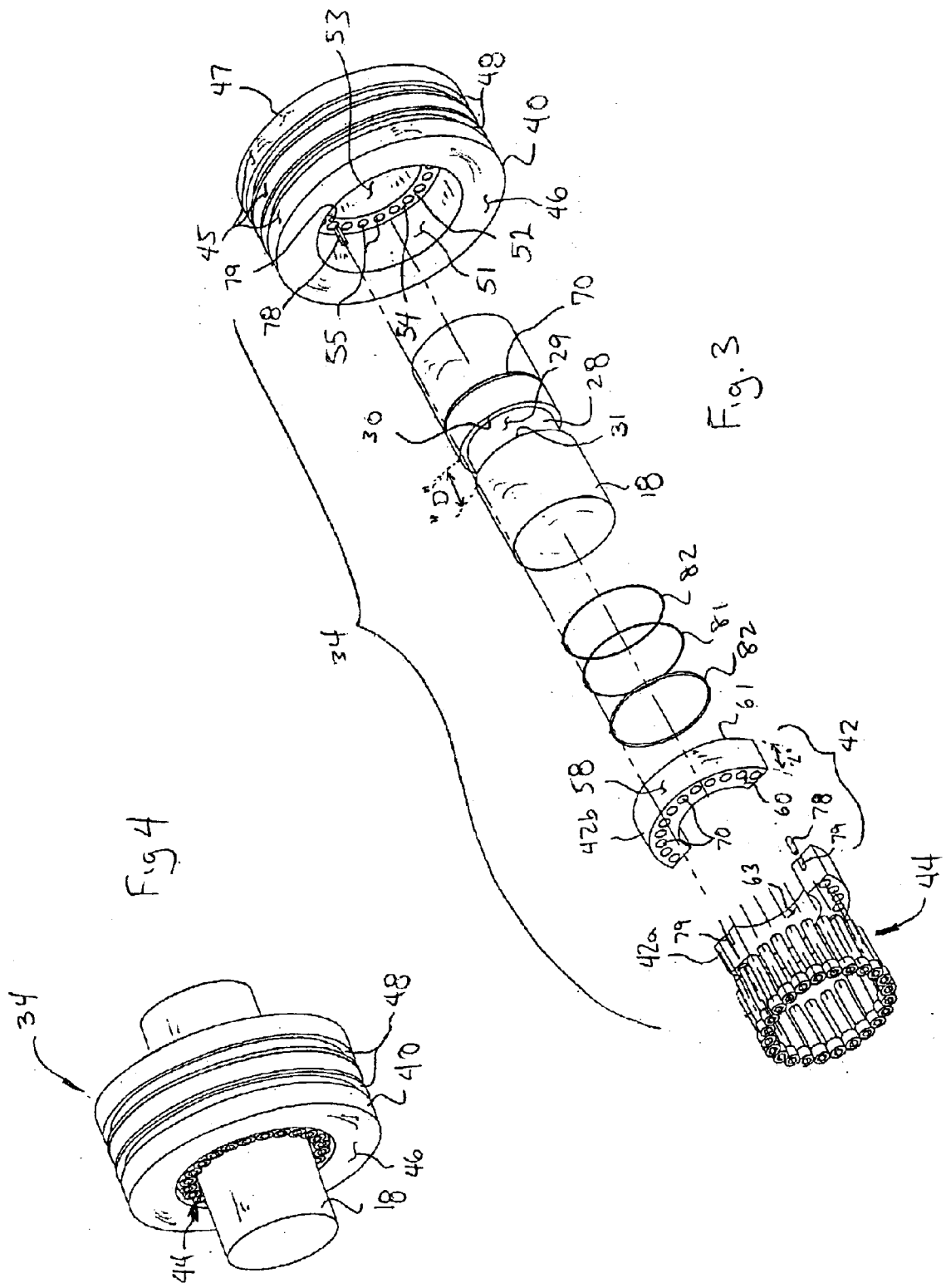

DOUBLE ROD END CYLINDER WITH SPLIT RING COUPLING

CROSS-REFERENCE TO RELATED CASES

The present application claims the benefit of the filing date of U.S. Provisional Application Ser. No. 60/353,795; filed Feb. 1, 2002, the disclosure of which is expressly incorporated herein by reference.

FIELD OF THE INVENTION

The present invention relates generally to fluid-operated cylinder assemblies, and more particularly to fluid-operated cylinder assemblies utilizing a split ring coupling.

BACKGROUND OF THE INVENTION

Fluid-actuated cylinders are known which have an elongated piston rod located in a cylinder housing and supported for longitudinal movement. In certain of these cylinders, typically referred to as "double rod end cylinders", the rod is supported such that the ends of the rod project outwardly from opposite ends of the housing. A piston assembly is attached to the rod along the length of the rod, and includes a ring-shaped piston which is fluidly sealed to the housing as the rod reciprocates, to define first and second fluidly-separated chamber portions at opposite ends of the housing. The controlled introduction/removal of fluid in the chamber portion(s) moves the piston rod in the desired direction in the housing.

Various techniques have been developed to attach the piston assembly to the rod. One known technique is to have a pair of piston rod portions, and to capture the ring-shaped piston between the ends of the rod portions as the rod pistons are connected together (such as by a threaded connection). Another known technique is to turn and grind a unitary (one piece) piston rod, and to thread the piston rod into a piston. In this technique, the rod can have an enlarged, radially-projecting annular shoulder which is received within a counterbore in the piston, to properly locate the piston on the piston rod.

A still further technique is to provide two piston halves, screw threads on a piston rod, and to locate a wire in the slots defined by the threads. The piston halves are then screwed onto the piston rod against one another, with the wire retaining the piston halves on the rod.

The above techniques are useful in many applications; however, they can require special, higher-cost material for the piston rod; have concentricity issues (between the piston and rod; as well as between two piston portions); require tight tolerances between the inter-engaging threads; and can require complicated machining and/or assembly, which make many of these techniques expensive to manufacture and repair.

It is further known to form a groove in the piston rod and to locate a split ring in the groove, and then to connect the split ring by some means (such as screws or bolts) to the piston. Some applications of this technique use radial or axial pressure to retain the split ring within the groove, such as by threaded locking nuts bearing against one side of the split ring (U.S. Pat. No. 3,426,657); a two-piece piston ring clamped around a split ring (U.S. Pat. No. 4,004,499); or slip-fit locking nuts or bearing bands outwardly surrounding the split ring (U.S. Pat. No. 3,457,842). U.S. Pat. No. 4,180,274, as a further example, uses multiple tongue and grooves formed in the split ring and piston rod, and then an additional snap ring to retain the snap ring on the piston.

However, as can be appreciated, these applications also require additional components, multiple machining steps and/or close tolerances with the piston and the split ring. As such, it is believed that, regardless of the technique used, several complex components and/or machining steps are necessary in the known prior art to hold the piston on the piston rod.

It is therefor believed there is a demand for an improved technique for attaching a piston to a piston rod, and particularly an improved technique for retaining a piston to a piston rod which employs a split ring, where the technique is simple and straightforward, does not require additional components or difficult machining steps, and thereby reduces the manufacturing and repair expenses associated with the fluid cylinder.

SUMMARY OF THE PRESENT INVENTION

The present invention provides a novel and unique attachment of a piston to a piston rod which is simple and straightforward, does not require additional components or difficult machining steps, and thereby reduces the manufacturing and repair expenses associated with the fluid cylinder.

According to the present invention, a piston rod with a circumferential groove is provided, and a split ring, with predetermined linear expansion properties, is first cooled to a temperature below the temperature of the piston rod. The ring normally has an axial length somewhat longer than the axial length of the groove in the piston rod, but when cooled, has a length somewhat smaller than the groove, such that the split ring coupling can be easily located in the groove. The ring is then equalized with the temperature of the piston rod, and in so doing, expends into compression against the sidewalls of the groove. This expansion creates an interference fit with the groove, and prevents axial and rotational movement of the ring with respect to the piston rod. The expansion also prestresses the piston rod between the groove sidewalls, which increases the fatigue resistance of the piston rod.

After the ring is located and fixed to the rod as above described, the ring halves are then connected such as with bolts to an internal, radially-inward projecting annular flange on the piston. The bolts are received through axial openings in the split ring coupling, and into corresponding axial threaded openings in the annular flange of the piston to securely and rigidly fix the piston with respect to the piston rod.

The piston rod assembly is then located in a cylinder housing, with the piston providing a fluid seal with the cylinder walls as the piston rod reciprocates within the housing.

In some applications, a further circumferential groove, spaced from the first groove, can be provided on the outer surface of the piston rod, and an annular seal can located in the further groove in sealing engagement with piston, if necessary or desirable.

The technique as described above is particularly useful for double rod end cylinders, but also finds applicability to single rod end cylinders, as well as to other applications where it is necessary or desirable to use a split ring to couple a piston to a piston rod.

The present invention thereby provides an improved technique for attaching a piston to a piston rod, and particularly an improved technique for retaining a piston to a piston rod which employs a split ring, where the technique is simple and straightforward, does not require additional components or difficult machining steps, and thereby reduces the manufacturing and repair expenses associated with the fluid cylinder.

Further features of the present invention will become apparent to those skilled in the art upon reviewing the following specification and attached drawings.

BRIEF DESCRIPTION OF THE DRAWINGS

FIG. 3 is an exploded view of the piston rod and piston assembly for the cylinder of FIG. 1;

FIG. 4 is an assembled view of the piston rod and piston assembly of FIG. 3;

DETAILED DESCRIPTION OF THE PREFERRED EMBODIMENT

Figure 1:
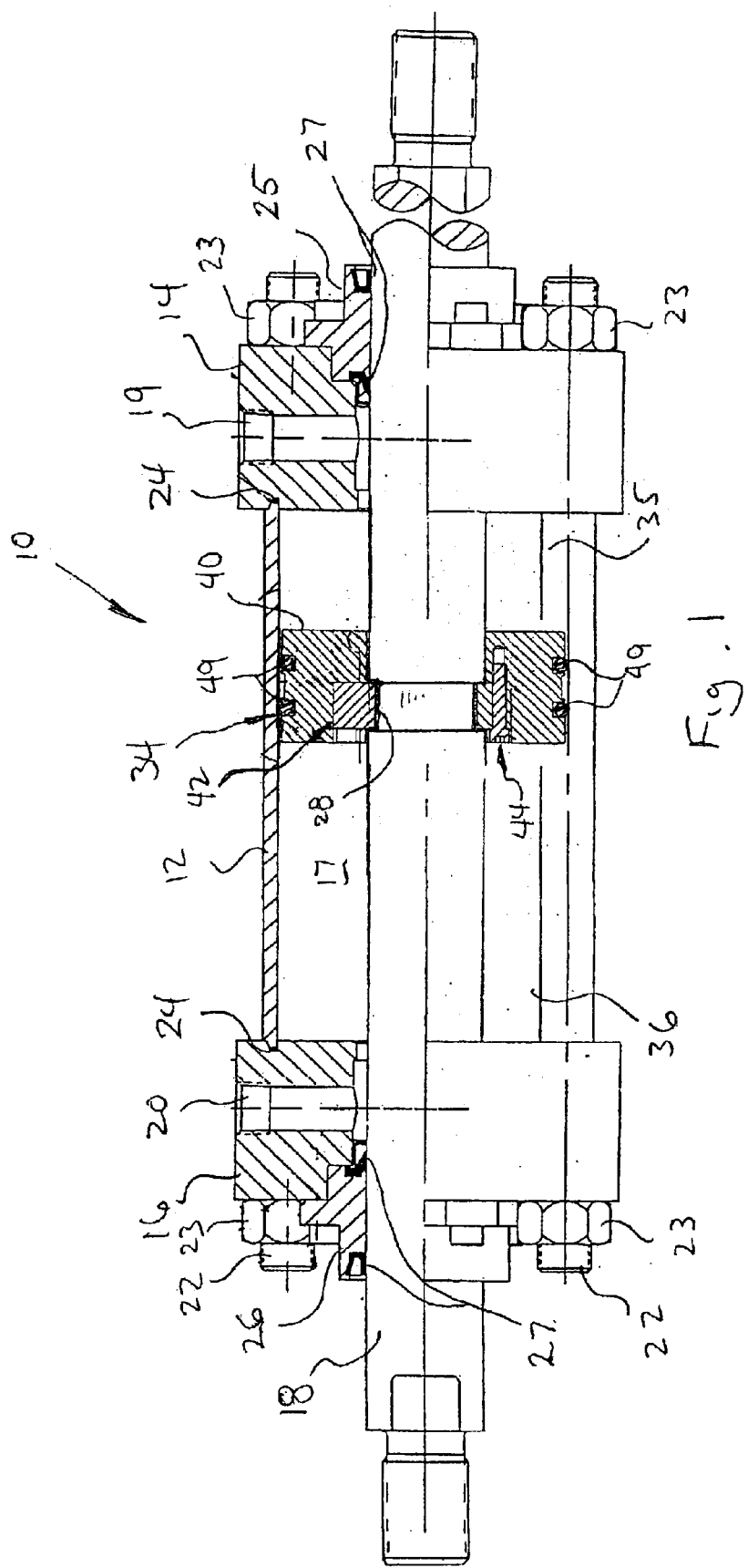
FIG. 1 is a cross-sectional side view of a cylinder constructed according to the principles of the present invention.

Referring to the drawings, and initially to FIG. 1, a fluid-actuated cylinder constructed according to the principles of the present invention is indicated generally at 10. The cylinder 10 includes an elongated, hollow, preferably tubular housing 12 having cylinder heads 14, 16 enclosing opposite ends of the housing. The housing 12 and cylinder heads 14, 16 define an internal piston chamber 17. An elongated, preferably unitary (one piece), piston rod 18 is slideably supported within the piston chamber, and moveable in both axial directions through circular openings formed in the cylinder heads. Inlet and outlet ports 19, 20 are provided in cylinder heads 14, 16, respectively, to direct fluid into and out of opposite ends of the piston chamber 17 to reciprocate the piston rod, as will be described in more detail below.

Cylinder heads 14, 16 are preferably removably connected to the housing 12 in any appropriate manner, as should be well within the knowledge of those skilled in the art. As illustrated, elongated tie rods 22 project through the housing from one end to the other, and nuts 23 are provided on the ends of the tie rods to retain the cylinder heads on the housing, although again, other techniques could be used. Seals 24 can be provided at the ends of the housing where the housing butts up against the cylinder heads to fluidly seal the housing to the cylinder heads.

Bushings 25, 26 are bolted on the cylinder heads 14, 16, respectively, and carry inner and outer seals/wipers 27 to provide a fluid seal against the piston rod 18 as the piston rod reciprocates within the housing. The seals/wipers 27 can take many shapes, and are retained on the bushings in any appropriate manner.

The aforementioned components of the cylinder housing are conventional and should be well-known to those of ordinary skill in the art. The components are made out of material appropriate for the particular application, preferably using conventional manufacturing techniques. It should be appreciated that the above is only one embodiment of the present invention, and that the present invention is appropriate for many embodiments of a fluid-actuated cylinder. In particular, it should be appreciated that the illustrated embodiment shows a double rod end cylinder, that is, a cylinder where the piston rod projects outwardly from both ends of the cylinder. This type of rod is appropriate for many applications, and the present invention is particularly useful with this type of cylinder. However, it should be appreciated that the present invention is also useful with other cylinder types, such as single rod end cylinders. Thus, the description of the present invention being used with a double ended cylinder is meant to be exemplary in nature, and is not meant to be limiting to the illustrated embodiment.

Likewise, the piston rod is illustrated as being formed from a single piece, i.e., having a unitary form. This is preferred, as it allows the piston rod to be manufactured in a minimum number of steps, and maintains straightness and concentricity (e.g., as compared to a two-piece piston rod); although again, it should be appreciated that the present invention could be just as useful with multiple piece piston rods, if the application so required.

Figure 2:
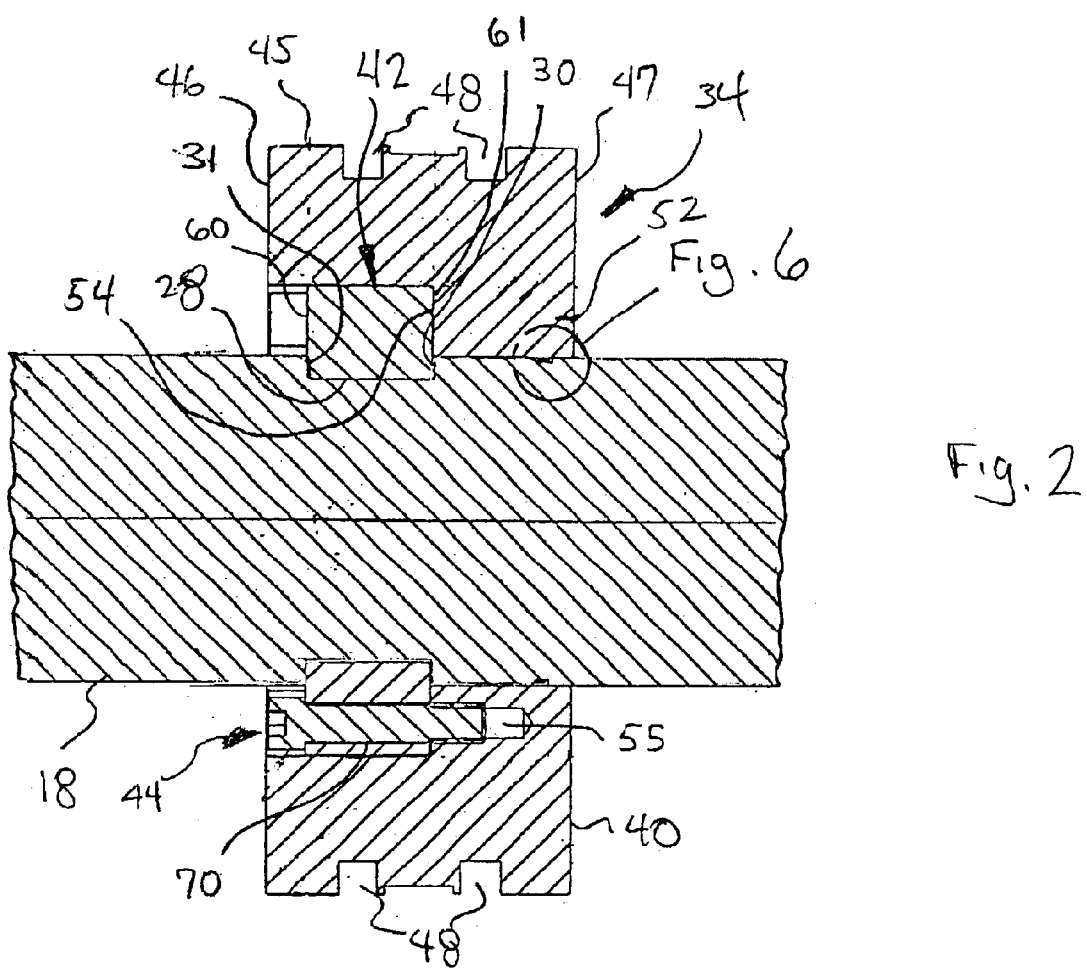
FIG. 2 is an enlarged view of a portion of the piston rod and piston assembly of FIG. 1.

In any case, referring now to FIGS. 1–3, the piston rod 18 includes a groove 28 formed (machined) circumferentially around the outer surface of the rod. The groove can be formed at any location appropriate for the particular application, and is preferably formed toward the middle for a double rod end cylinder. As shown particularly in FIG. 3, the groove 28 includes a recessed sidewall portion 29 and a pair of opposing sidewalls 30, 31 at opposite ends of the sidewall portion 29. The sidewalls 30, 31 project radially outward preferably substantially normal/transverse to the axis of the piston rod.

A piston assembly, indicated generally at 34, is fixed to the piston rod 18, and provides a fluid-tight seal between the piston rod and the housing 12 as the piston rod reciprocates. The piston assembly 34 divides the piston chamber 17 into fluidly-separated chamber portions 35, 36, each of which is in communication with a respective port 19, 20. As should be appreciated, the introduction of fluid into one of ports 19, 20 and the removal of fluid from the other of ports 19, 20, increases the fluid pressure against one side of the piston assembly, which moves the piston assembly, and piston rod, axially within the cylinder. Of course, the introduction and removal of fluid from the opposite port arrangement causes the piston rod to move in the other direction. Thus, controlling the introduction and removal of fluid in the cylinder causes the piston rod to reciprocate within the cylinder housing 12.

The piston assembly 34 includes i) a ring-shaped piston 40; ii) a split ring coupling, indicated generally at 42; and iii) fasteners, indicated generally at 44, for fastening the split ring coupling 42 to the piston 40. As shown in FIGS. 1–4, the piston 40 has a smooth exterior surface 45 and flat annular end faces 46, 47, and is dimensioned to be closely received within the housing 12. One or more exterior circumferentially extending channels or grooves 48 can be formed along the length of the piston, and appropriate seals/wipers 49 can be located therein to provide a fluid-tight seal with the housing 12. The axial length of the piston can vary depending upon the particular application, as should be appreciated by those skilled in the art.

The piston 40 preferably has a smooth annular inner surface 51, and includes an internal, radially inward projecting annular flange 52, located toward one end of the piston. The annular flange 52 also has a smooth annular inner surface 53 with a diameter dimensioned to closely receive the piston rod 18; and a forward annular end face 54. A series of evenly-spaced, axially extending threaded bolt holes, as at 55, are provided in flange 52, the reason for which will be described more fully below.

The split ring coupling, as shown in FIGS. 1–3, preferably comprises a pair of semi-circular ring portions 42a, 42b, which when assembled together (end-to-end), define a continuous ring. While two ring portions are shown, it should be appreciated that more than two ring portions could be used, although it understandably then becomes more difficult to manufacture and assemble a multi-piece split ring. The split ring coupling 42 has a smooth exterior surface 58 with an outer diameter that fits loosely within the inner surface 51 of the piston 40; and a pair of annular end faces 60, 61, each of which extend substantially transversely to the axis of the ring.

The split ring coupling is received within the groove 28 formed along the piston rod 18. The split ring coupling has a smooth inner surface 63 with an inner diameter which loosely surrounds the recessed sidewall portion 29 of groove 28, and which is therefore slightly smaller than the outer diameter of the remainder of the piston rod 18. The depth of the groove and the radial dimensions of the split ring coupling can vary depending upon the application (e.g., the desired load carrying capacity of the piston assembly), and can also be readily calculated by those of ordinary skill in the art. The split ring coupling 42 has an axial length "L" which is slightly longer than the axial distance "D" between the sidewalls 30, 31 of the groove, at least when the split ring coupling and piston rod are at the same temperature. To locate the split ring coupling in the groove, the ring portions 42a, 42b are cooled to a temperature somewhat below the temperature of the piston rod such that the split ring coupling has an axial dimension less than the distance between the sidewalls, and the coupling loosely fits within the groove. The exact temperature necessary for cooling the coupling portions can be easily determined by the axial length of the split ring coupling portions, the axial length of the groove, the coefficient of thermal (linear) expansion of the coupling material, and the desired fit (compression) between the split ring coupling 42 and the sidewalls 30, 31 of the groove 28 depending on the load capacity of the cylinder.

After the split ring coupling is cooled and located in the groove, the split ring coupling is brought back up to the temperature of the piston (i.e., ambient temperature), such that the temperature is equalized between the split ring coupling and the piston rod. When so assembled, the end faces 60, 61 of the split ring coupling directly engage the sidewalls 31, 30, respectively, of the groove 28. Compression occurs between the split ring coupling and the sidewalls of the groove. An interference fit is preferably created between the split ring coupling and the piston rod, such that the coupling is axially and rotationally fixed with respect to the rod. An additional benefit is that the piston rod is put under stress (i.e., "prestressed"), at least in the axial area between the sidewalls of the groove, which is believed prolongs the life of the piston rod during repeated cycling.

The split ring coupling has a series of evenly-spaced, axially extending through holes as at 70, and the piston 40 is slid over the piston rod/split ring coupling subassembly, such that the annular end face 61 of the split ring coupling is located in adjacent, surface-to-surface relation with the annular end face 54 of the piston, and through holes 70 in the split ring coupling are aligned with the threaded holes 55 in the inner flange of the piston. A pair of dowel pins 78 can be located in holes 79 in the split ring coupling and in the flange 52 of the piston to properly rotationally align these components.

The fasteners 44 preferably comprise a series of elongated bolts or mounting screws, which are then received in through holes 70 in the split ring coupling and corresponding threaded holes 55 in the piston ring, to securely and rigidly fix the split ring coupling to the piston, and hence securely and rigidly fix the piston to the piston rod. Appropriate locking compound can be used with the bolts/screws, if necessary or desirable. The number of bolts/screws appropriate for the particular application can vary, and can be easily determined by those of ordinary skill in the art.

Figure 6:
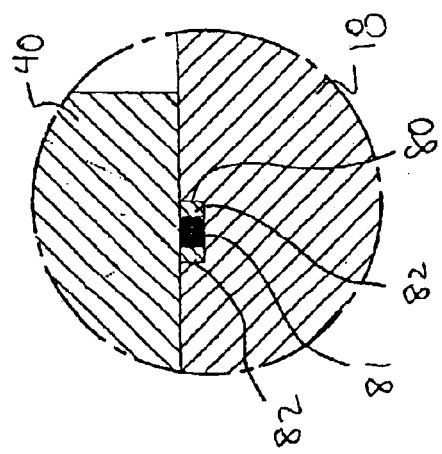
FIG. 6 is an enlarged view of a portion of the piston rod and piston assembly of FIG. 2.
Figure 5:
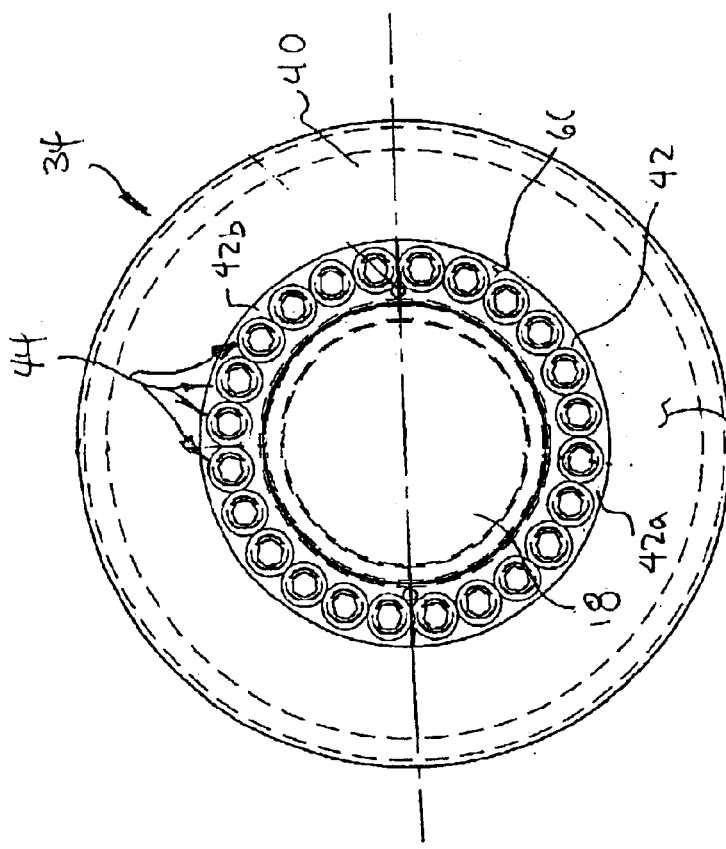
FIG. 5 is an end view of the piston rod and piston assembly.

In many applications, it is believed a fluid-tight mechanical seal will be created between the piston 40 and piston rod 18, by virtue of the attachment technique described above. However, if necessary or desirable, a further circumferential groove 80 (see also, FIG. 6) can be provided in the exterior surface of the piston rod in the area surrounded by the inner surface 53 of the piston, and an O-ring 81 and a pair of back-up rings 82 can be located in the groove, to further provide a seal between the piston and rod.

Thus, as described above, the present invention thereby provides an improved technique for attaching a piston to a piston rod, and particularly an improved technique for retaining a piston to a piston rod which employs a split ring, where the technique is simple and straightforward, does not require additional components or difficult machining steps, and thereby reduces the manufacturing and repair expenses associated with the fluid cylinder.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A double rod end cylinder, comprising:

an elongated cylinder body having first and second ends and defining an internal piston chamber;

an elongated unitary piston rod moveably disposed within the body and projecting outwardly from both ends of the body, the piston rod including a circumferentially extending first groove in its outer surface along the length of the piston rod; and a piston assembly rigidly coupled to the piston rod in surrounding relation therewith and in sealing engagement with the cylinder body to define first and second fluidly-separated chamber portions at opposite ends of the cylinder body, the piston assembly including a ring-shaped piston, a split ring coupling with predetermined linear expansion properties, and fastening means for securely and rigidly fastening the split ring coupling to the piston; the split ring coupling being initially at a reduced temperature with respect to the piston rod so as to be loosely located in the first groove and then being equalized to the temperature of the piston rod so that the split ring coupling axially expands and has an interference fit within the first groove in the piston rod such that the split ring coupling is rotationally and axially fixed with respect to the piston rod.

2. The double rod end cylinder as in claim 1, wherein the first groove includes opposing circumferential side walls, and the split ring coupling, when at the reduced temperature, initially has an axial dimension less than the distance between the sidewalls, and then has an axial dimension greater than the initial axial dimension and sufficient to create an interference fit with the sidewalls when the split ring coupling is at the same temperature as the piston rod.

3. The double rod end cylinder as in claim 2, wherein the split ring directly engages the opposing sidewalls of the groove in the piston rod when the spilt ring coupling is at the same temperature as the piston rod.

4. The double rod end cylinder as in claim 3, wherein the split ring coupling has a minimum internal diameter smaller than a maximum external diameter of the piston rod, and an external diameter surrounded by and loosely received within the piston.

5. The double rod end cylinder as in claim 4, wherein said fastening means comprises a plurality of bolts received through axial openings in the split ring coupling, and with corresponding axial threaded openings in an internal, radially-inward projecting annular flange of the piston.

6. The double rod end cylinder as in claim 5, wherein the split ring coupling has an annular end face which is located in adjacent, surface-to-surface relation with the annular flange of the piston.

7. The double rod end cylinder as in claim 1, wherein the split ring coupling comprises a pair of semi-circular ring portions, the ring portions being located such that they form a continuous ring.

8. The double rod end cylinder as in claim 1, wherein a further circumferential groove is provided on the outer surface of the piston rod, spaced from the first groove, and an annular seal is located in the further groove in sealing engagement with the piston.

9. A method for assembling the double rod end cylinder of claim 1, wherein the split ring coupling is provided at a first temperature less than the temperature of the piston rod such that the split ring coupling has a smaller axial extent than the first groove and can be loosely located in the first groove, and the split ring coupling is then brought up to the temperature of the piston rod so that the split ring coupling axially expands into an interference fit with sidewalls of the groove in the piston rod.

10. A fluid-actuated cylinder, comprising:
    an elongated cylinder body having first and second ends and defining an internal piston chamber;
    an elongated unitary piston rod moveably disposed within the body and projecting outwardly from at least one end of the body, the piston rod including a circumferentially extending first groove in its outer surface along the length of the piston rod; and
    a piston assembly rigidly coupled to the piston rod in surrounding relation therewith and in sealing engagement with the cylinder body to define first and second fluidly-separated chamber portions at opposite ends of the cylinder body, the piston assembly including a ring-shaped piston, a split ring coupling with predetermined linear expansion properties and fasteners rigidly and securely fastening the split ring coupling to the piston; the split ring coupling located in the first groove and having an interference fit with opposing sidewalls of the groove in the piston rod such that the split ring coupling is rotationally and axially fixed with respect to the piston rod and the piston rod is prestressed.

11. The fluid-actuated cylinder as in claim 10, wherein the first groove includes opposing circumferential side walls, and the split ring coupling is under compression between the sidewalls and the portion of the piston rod between each sidewall is put under tension.

12. The fluid-actuated cylinder as in claim 11, wherein the split ring directly engages the opposing sidewalls of the groove in the piston rod.

13. The fluid-actuated cylinder as in claim 12, wherein the split ring coupling has a minimum internal diameter smaller than a maximum external diameter of the piston rod, and an external diameter surrounded by and loosely received within the piston.

14. The fluid-actuated cylinder as in claim 13, wherein said fasteners comprise a plurality of bolts received through axial openings in the split ring coupling, and into corresponding axial threaded openings in an internal, radially-inward projecting annular flange of the piston.

15. The fluid-actuated cylinder as in claim 14, wherein the split ring coupling has an annular end face which is located in adjacent, surface-to-surface relation with the annular flange of the piston.

16. The fluid-actuated cylinder as in claim 10, wherein the split ring coupling comprises a pair of semi-circular ring portions, the ring portions being located such that they form a continuous ring.

17. The fluid-actuated cylinder as in claim 10, wherein a further circumferential groove is provided on the outer surface of the piston rod, spaced from the first groove, and an annular seal is located in the further groove in sealing engagement with the piston.

18. A method for assembling a fluid-actuated cylinder, comprising the steps of:
    providing an elongated cylinder body having first and second ends and defining an internal piston chamber;
    providing a unitary, elongated piston rod including a circumferentially extending first groove in its outer surface along the length of the piston rod;
    rigidly coupling a piston assembly to the piston rod, the piston assembly including a ring-shaped piston, a split ring coupling with predetermined linear expansion properties and fastening means rigidly and securely fastening the split ring coupling to the piston; the coupling step including reducing the temperature of the split ring coupling with respect to the piston rod so that the split ring coupling can be located in the first groove, locating the split ring coupling in the first groove, and then equalizing the temperature of the split ring coupling and the piston rod such that the split ring coupling axially expands into an interference fit with the first groove in the piston rod such that the split ring coupling is rotationally and axially fixed with respect to the piston rod and the piston rod is prestressed; and
    locating the piston rod and piston assembly within the cylinder body with the piston assembly in sealing engagement with the cylinder body to define first and second fluidly-separated chamber portions at opposite ends of the cylinder body.

19. The method as in claim 18, wherein the piston includes an internal, radially-inward projecting annular flange, and the split ring coupling has an annular end face which is located in adjacent, surface-to-surface relation with the annular flange of the piston, and further including the step of inserting a plurality of bolts through the axial openings in the split ring coupling, and into corresponding axial threaded openings in the internal, radially-inward projecting annular flange of the piston to couple the piston to the split ring coupling.

* * * * *